(12) United States Patent
Kang

(10) Patent No.: US 9,971,484 B2
(45) Date of Patent: May 15, 2018

(54) ELECTRONIC DEVICE AND METHOD FOR EXECUTING ONE OR MORE OBJECTS BASED ON THE RELATIONSHIPS OF THE OBJECTS

(71) Applicant: Samsung Electronics Co., Ltd., Gyeonggi-do (KR)

(72) Inventor: Myung-Su Kang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 53 days.

(21) Appl. No.: 14/257,337

(22) Filed: Apr. 21, 2014

(65) Prior Publication Data
US 2014/0380239 A1  Dec. 25, 2014

(30) Foreign Application Priority Data

Jun. 21, 2013 (KR) .................. 10-2013-0071391

(51) Int. Cl.
*G06F 3/048* (2013.01)
*G06F 3/0484* (2013.01)
*G06F 3/01* (2006.01)
*G06F 3/0482* (2013.01)
*G06F 3/0488* (2013.01)

(52) U.S. Cl.
CPC .......... *G06F 3/04842* (2013.01); *G06F 3/017* (2013.01); *G06F 3/0482* (2013.01); *G06F 3/04883* (2013.01)

(58) Field of Classification Search
CPC .......... G09G 5/14; G09G 5/06; G06F 9/4443; H04N 5/44543; H04M 1/56
USPC .................................. 715/810, 769
See application file for complete search history.

(56) References Cited

U.S. PATENT DOCUMENTS 8,869,068 B2 * 10/2014 Primiani ................. G06F 3/048
715/810
2003/0131007 A1  7/2003 Schirmer et al.
(Continued)

FOREIGN PATENT DOCUMENTS

CN    102037437 A    4/2011
CN    102760041 A    10/2012
(Continued)

OTHER PUBLICATIONS

European Search Report, dated Dec. 8, 2016.
Chinese Search Report dated Dec. 19, 2017.

*Primary Examiner* — Joy M Weber
(74) *Attorney, Agent, or Firm* — Cha & Reiter, LLC

(57) ABSTRACT

The present invention provides an electronic apparatus and method for executing object in the electronic apparatus that performs a specific function based on relations between multiple objects, the object executing apparatus including a display unit for displaying a list of at least one related object to a first object for which a selection gesture is made, the at least one related object capable of performing respective function related to the first object; and a controller for controlling a specific function to be performed based on relationship between a first function of the first object and a second function of a second object among the at least one related object if a link gesture to connect the first object and the second object is made.

12 Claims, 20 Drawing Sheets

(56) References Cited

U.S. PATENT DOCUMENTS

| | | | |
|---|---|---|---|
| 2005/0235209 A1* | 10/2005 | Morita | G06F 3/0482 |
| | | | 715/716 |
| 2008/0222569 A1* | 9/2008 | Champion | G06F 3/0482 |
| | | | 715/834 |
| 2009/0125842 A1 | 5/2009 | Nakayama | |
| 2009/0222766 A1 | 9/2009 | Chae et al. | |
| 2010/0138763 A1 | 6/2010 | Kim | |
| 2010/0318601 A1 | 12/2010 | Park et al. | |
| 2011/0066976 A1 | 3/2011 | Hwang | |
| 2011/0072373 A1 | 3/2011 | Yuki | |
| 2011/0265041 A1* | 10/2011 | Ganetakos | A63F 13/12 |
| | | | 715/834 |
| 2012/0159387 A1 | 6/2012 | Oh et al. | |
| 2012/0260218 A1* | 10/2012 | Bawel | G06F 3/04815 |
| | | | 715/841 |
| 2012/0274581 A1* | 11/2012 | Kim | G06F 3/0482 |
| | | | 345/173 |
| 2013/0019175 A1* | 1/2013 | Kotler | G06F 3/0482 |
| | | | 715/728 |
| 2014/0071063 A1* | 3/2014 | Kuscher | G06F 3/041 |
| | | | 345/173 |
| 2015/0215447 A1* | 7/2015 | Chae | G06F 3/0482 |
| | | | 455/564 |

FOREIGN PATENT DOCUMENTS

| | | |
|---|---|---|
| EP | 2 518 610 A2 | 10/2012 |
| KR | 10-2010-0134495 A | 12/2010 |
| KR | 10-2012-0069494 A | 6/2012 |

* cited by examiner

ELECTRONIC DEVICE AND METHOD FOR EXECUTING ONE OR MORE OBJECTS BASED ON THE RELATIONSHIPS OF THE OBJECTS

CLAIM OF PRIORITY

This application claims the benefit of priority under 35 U.S.C. § 119(a) of a Korean Patent Application filed in the Korean Intellectual Property Office on Jun. 21, 2013, and assigned Serial No. 10-2013-0071391, the entire disclosure of which is incorporated herein by reference, in its entirety.

BACKGROUND

1. Technical Field

The present disclosure concerns an object executing system that performs a specific function based on relationships between multiple objects, for example.

2. Description of the Related Art

In order to use a function of an executable application, a user needs to know the configuration and items of the application in advance. If the user does not know which application a function belongs to, the user needs to discover which application supports the function. An integrated widget comprises portable code intended for one or more different software platforms and provides multiple functions and uses icons for respective application specific functions. To obtain additional information, the user has to execute an application and manually input a particular word or a keyword to search for a function to execute. This is a cumbersome time consuming process.

As an example, to change telephone call settings in a smart phone, a user needs to run a call application and navigate menus to change the settings or needs to enter the entire system settings mode and find a call-related item to change related settings. To change message settings, a user needs to execute a message application and navigate multiple menus to change the settings and needs to find a related function menu. A widget having a function that integrates functions of multiple executable applications enables a user to use respective functions of the applications simultaneously or individually. Such an integrated widget is inconvenient for a user unfamiliar with the equipment concerned, such as a smartphone

SUMMARY

A system executes an object in response to relationships between respective functions of multiple objects and performs a specific function based on relationships between multiple objects, allowing a user to intuitively locate a specific function. The system enables a user to perform a specific function conveniently in response to relationships between multiple objects without intervening steps.

In accordance with an aspect of the present invention, provided is an electronic apparatus including: a display unit for displaying a list of at least one related object to a first object for which a selection gesture is made, the at least one related object capable of performing respective function related to the first object; and a controller for controlling a specific function to be performed based on relationship between a first function of the first object and a second function of a second object among the at least one related object if a link gesture to connect the first object and the second object is made.

In accordance with another aspect of the present invention, provided is an object executing method including: displaying a list of at least one related object to a first object for which a selection gesture is made, the at least one related object capable of performing respective function related to the first object; and performing a specific function based on relationship between a first function of the first object and a second function of a second object among the at least one related object if a link gesture to connect the first object and the second object is made.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be better appreciated by an artisan from the following description taken in conjunction with the accompanying drawings in which.

Throughout the drawings, like reference numerals will be understood to refer to like parts, components, and structures.

DETAILED DESCRIPTION

The following description with reference to the accompanying drawings is provided to assist a person of ordinary skill in the art with a comprehensive understanding of the invention. The description includes various specific details to assist in that understanding but these are to be regarded as merely exemplary for illustrative purposes. Accordingly, those of ordinary skill in the art will recognize that various changes and modifications of the embodiments described herein can be made. In addition, descriptions of well-known functions and constructions may be omitted for clarity and conciseness when their inclusion may obscure an artisan's appreciation of the subject matter of the present invention. The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural references unless the context clearly dictates otherwise. Thus, for example, a reference to "a component surface" includes reference to one or more of such surfaces.

Figure 1:
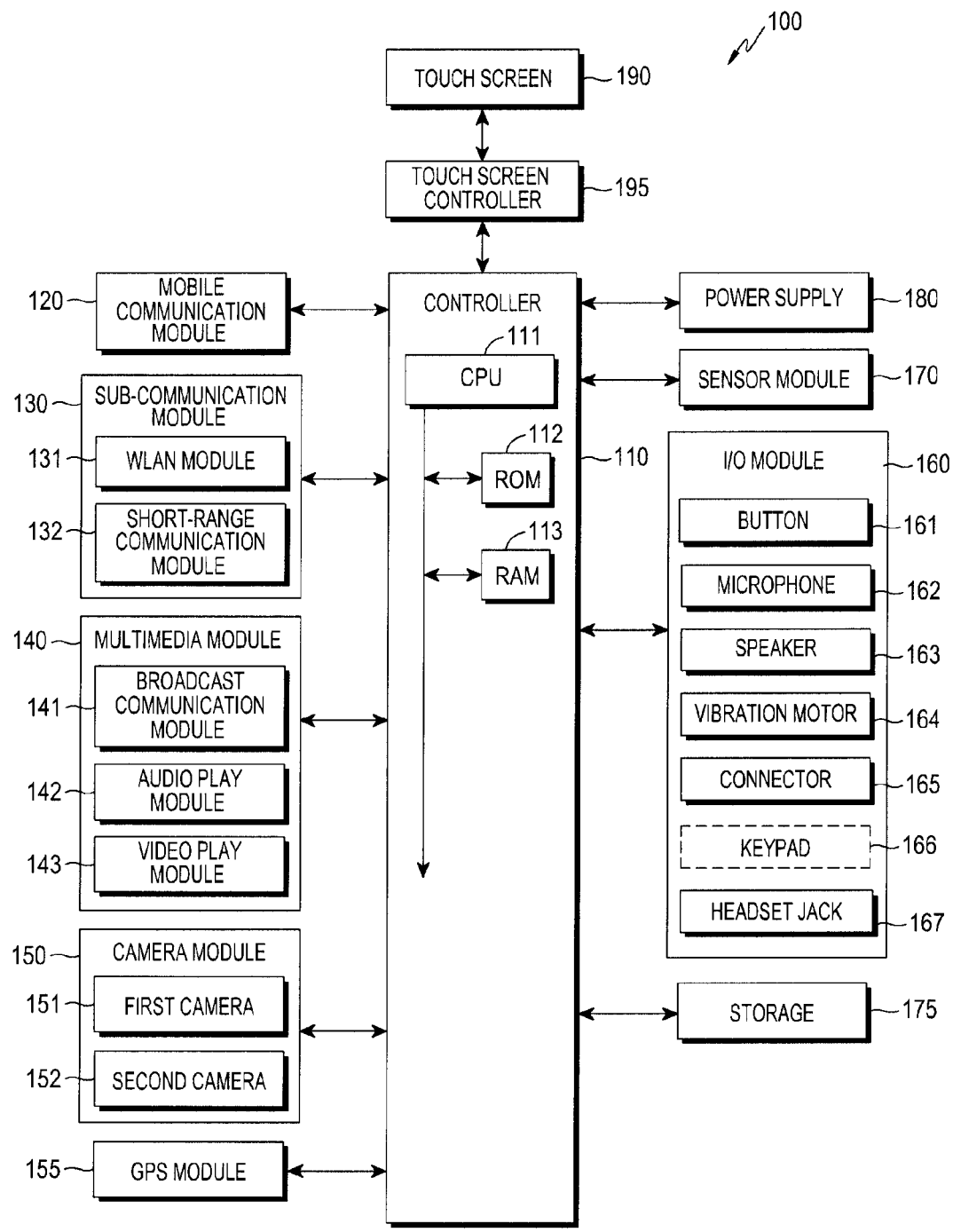
FIG. 1 is a schematic block diagram of an electronic apparatus, according to an exemplary embodiment of the present invention.

FIG. 1 is a schematic block diagram of an electronic apparatus, according to an exemplary embodiment of the present invention.

Referring to FIG. 1, an apparatus 100 may be connected to an external device (not shown) by using an external device connection, such as a sub-communication module 130, a connector 165, and a headset jack 167. The "external device" may include a variety of devices, such as earphones, external speakers, Universal Serial Bus (USB) memories, chargers, cradles/docks, Digital Multimedia Broadcasting (DMB) antennas, mobile payment related devices, health care devices (e.g., blood sugar testers), game consoles, vehicle navigations, or the like, which are removable from the apparatus 100 and connected thereto via cable. The "external device" may also include a short range communication device that may be wirelessly connected to the apparatus 100 via short range communication, such as Bluetooth, Near Field Communication (NFC), and may comprise a Wireless Fidelity (WiFi) Direct communication device, a wireless Access Point (AP). Furthermore, the external device may include another device, such as a cell phone, smartphone, tablet PC, desktop PC, and server.

The apparatus 100 includes a display unit 190 and a display controller 195. The apparatus 100 also includes a controller 110, the mobile communication module 120, the sub-communication module 130, a multimedia module 140, a camera module 150, a Global Positioning System (GPS) module 155, an input/output module 160, a sensor module 170, storage 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and video play module 143. The camera module 150 includes at least one of a first camera 151 and a second camera 152; and the input/output module 160 includes at least one of buttons 161, a microphone 162, a speaker 163, a vibration motor 164, a connector 165, and a keypad 166. Hereinafter, the display unit 190 and the display controller 195 are assumed to be e.g., a touchscreen and a touchscreen controller, respectively.

The controller 110 may include a Central Processing Unit (CPU) 111, a Read Only Memory (ROM) 112 for storing a control program to control the user terminal 100, and a Random Access Memory (RAM) 113 for storing signals or data input from an outside or for being used as a memory space for working results of the apparatus 100. The CPU 111 may include a single core, dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module, the input/output module 160, the sensor module 170, the storage 175, the power supply 180, the touch screen 190, and the touch screen controller 195. In an exemplary embodiment of the present invention, when a gesture to select a first object is made, the controller 110 controls a list of related objects to be displayed on the touch screen 190, the related objects are capable of performing a function related to the first object. If a link gesture to connect the first object and a second object is made, the controller 110 controls a specific function based on relationships between respective functions of the first and second objects to be executed. Depending on the sequence of the first and second objects selected by a link gesture, the controller 110 may interpret the relationships between the first and second objects differently and thus perform different relationship specific functions.

Specifically, having detected a link gesture made on a touchscreen between displayed elements representing the first and second objects with the gesture starting from the first object, the controller 110 controls a specific function with a first function of the first object as a main function and a second function of the second object as a sub-function to be performed. Otherwise, having detected a link gesture made between the first and second objects starting from the second object, the controller 110 controls a specific function with the second function of the second object as a main function and the first function of the first object as a sub-function to be performed.

In another embodiment, having detected an additional (third) object to be additionally connected to the first and second objects subsequent to a link gesture made between the first and second objects, the controller 110 initiates display of an additional objects list of at least one object to be additionally connected. If the third object is selected from the additional objects list, the controller 110 controls a specific function based on relationships between functions of the first, second, and third objects to be performed. The controller 110 controls the additional objects list to be displayed through a user interface enabling the user to select the third object from the additional objects list.

In another embodiment, if a link gesture is made between the first object and at least two of the related objects from the related objects list, the controller 110 controls a specific function to be performed based on relationships between respective functions of the first object and the at least two related objects. Relationships between the first object and the at least two related objects and thus the specific function may vary depending on the sequence of the first object and the at least two related objects selected by the link gesture. If the link gesture is made between the first object and the at least two related object but the controller 110 fails to figure out a specific function based on relationships between the first object and the at least two related objects, the controller 110 may make a request to make another link gesture.

In various embodiments of the present invention, the selection gesture on an object to arrange and display the object and other related objects (or a list of other related objects) may include a long touch or hovering event. The link gesture may include overlapping between at least two objects, consecutive selection of the at least two objects, or dragging between the at least two objects. The mobile communication module 120 enables the apparatus 100 to be connected to an external device through mobile communication using at least one-one or more antennas (not shown) under control of the controller 110. The mobile communication module 120 transmits/receives wireless signals for voice calls, video conference calls, Short Message Service (SMS) messages, or Multimedia Message Service (MMS) messages to/from a cell phone (not shown), a smart phone (not shown), a tablet PC (not shown), or another device not shown), the phones having phone numbers entered into the apparatus 100. The sub-communication module 130 may include at least one of, WLAN module 131 and the short-range communication module 132. For example, the sub-communication module 130 may include either the WLAN module 131 or the-short range communication module 132, or both.

The WLAN module 131 may be connected to the Internet in a place where there is a wireless AP (not shown), under control of the controller 110. The WLAN module 131 supports Institute of Electrical and Electronic Engineers' (IEEE's) WLAN standard IEEE802.11x. The short-range communication module 132 may conduct short-range communication between the apparatus 100 and an image rendering device (not shown) under control of the controller 110. The short-range communication may include Bluetooth, Infrared Data Association (IrDA), WiFi-Direct, Near Field Communication (NFC), for example. The apparatus 100 may include at least one of the mobile communication module 120, the WLAN module 131 and the short-range communication module 132. For example, the user terminal 100 may include a combination of the mobile communication module 120, the WLAN module 131 and the short-range communication module 132.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown), under control of the controller 110. The audio play module 142 may play digital audio files (e.g., files having extensions, such as mp3, wma, ogg, or way) stored or received under control of the controller 110. The video play module 143 may play digital video files (e.g., files having extensions, such as mpeg, mpg, mp4, avi, move, or mkv) stored or received under control of the controller 110. The video play module 143 may also play digital audio files. The multimedia module 140 may include the audio play module 142 and the video play module 143 except for the broadcast communication module 141. The audio play module 142 or video play module 143 of the multimedia module 140 may be included in the controller 110.

The camera module 150 may include at least one of the first and second cameras 151 and 152 for capturing still images or video images under control of the controller 110. Furthermore, the first or second camera 151 or 152 may include an auxiliary light source (e.g., flash). The first camera 151 may be placed on the front of the apparatus 100 and the second camera 152 may be placed on the back of the apparatus 100. In an embodiment, the first and second cameras 151 and 152 are arranged adjacent to each other (e.g., the distance between the first and second cameras 151 and 152 may be within the range between 1 to 8 cm), capturing 3D still images or 3D video images. The GPS module 155 receives radio signals from a plurality of GPS satellites (not shown) in Earth's orbit, and may calculate the position of the apparatus 100 by using time of arrival from the GPS satellites to the apparatus 100. The input/output module 160 may include at least one of a plurality of buttons 161, the microphone 162, the speaker 163, the vibration motor 164, the connector 165, and the keypad 166.

The at least one of buttons 161 may be arranged on the front, side, or back of the housing of the apparatus 100, and may include at least one of power/lock button (not shown), volume button (not shown), menu button, home button, back button, and search button.

The microphone 162 generates electric signals by receiving voice or sound under control of the controller 110. The speaker 163 may output sounds corresponding to various signals (e.g., radio signals, broadcast signals, digital audio files, digital video files or photography signals) from the mobile communication module 120, sub-communication module 130, multimedia module 140, or camera module 150 to the outside under control of the controller 110. The speaker 163 may output sounds (e.g., button-press sounds or ringback tones) that correspond to functions performed by the apparatus 100. There may be one or multiple speakers 163 arranged in a proper position or proper positions of the housing of the apparatus 100. The vibration motor 164 may convert an electric signal to a mechanical vibration under control of the controller 110. For example, the apparatus 100 in a vibrating mode operates the vibrating motor 164 when receiving a voice call from another device (not shown). There may be one or more vibration motors 164 inside the housing of the apparatus 100. The vibration motor 164 may be driven in response to a touch activity or continuous touches of a user over the touch screen 190.

The connector 165 may be used as an interface for connecting the apparatus 100 to the external device (not shown) or a power source (not shown). Under control of the controller 110, the apparatus 100 may transmit data stored in the storage 175 of the apparatus 100 to the external device via a cable connected to the connector 165, or receive data from the external device. Furthermore, the apparatus 100 may be powered by the power source via a cable connected to the connector 165 or may charge the battery (not shown) with the power source. The keypad 166 may receive key inputs from the user to control the apparatus 100. The keypad 166 includes a physical keypad (not shown) formed in the user terminal 100, or a virtual keypad (not shown) displayed on the touchscreen 190. A headset (not shown) may be inserted into the headset jack 167 and thus connected to the apparatus 100.

The sensor module 170 includes at least one sensor for detecting a status of the apparatus 100. For example, the sensor module 170 may include a proximity sensor for detecting proximity of a user to the mobile device 10; an illumination sensor (not shown) for detecting an amount of ambient light of the apparatus 100; a motion sensor (not shown) for detecting the motion of the apparatus 100 (e.g., rotation of the apparatus 100, acceleration or vibration applied to the apparatus 100); a geomagnetic sensor (not shown) for detecting a direction using the geomagnetic field; a gravity sensor for detecting a direction of gravity action; and an altimeter for detecting an altitude by measuring atmospheric pressure. At least one sensor may detect the status and generate a corresponding signal to transmit to the controller 110.

The storage 175 may store signals or data input/output according to operations of the mobile communication module 120, the sub-communication module 130, the multimedia module 140, the camera module 150, the GPS module, the input/output module 160, the sensor module 170, the touch screen 190 under control of the controller 110. The storage 175 may store the control programs and applications for controlling the apparatus 100 or the controller 110. The term "storage" comprises unit 175, the ROM 112, RAM 113 in the controller 110, or a memory card (not shown) (e.g., an SD card, a memory stick) installed in the apparatus 100. The storage may also include a non-volatile memory, volatile memory, Hard Disc Drive (HDD), or Solid State Drive (SSD). S In exemplary embodiments of the present invention, the storage 175 may store a list of related objects for each of a plurality of objects executable in the apparatus 100, each related objects list including at least one related object capable of performing a function related to a corresponding object. The power supply 180 may supply power to one or more batteries (not shown) placed inside the housing of the apparatus 100 under control of the controller 110. The one or more batteries power the apparatus 100. The power supply 180 may supply the apparatus 100 with the power input from the external power source (not shown) via a cable connected to the connector 165. The power supply 180 may also supply the apparatus 100 with wireless power from an external power source using a wireless charging technology.

The touch screen 190 may provide the user with a user interface for various services (e.g., call, data transmission, broadcasting, photography services). The touchscreen 190 may send an analog signal corresponding to at least one touch input to the user interface to the touchscreen controller 195. The touch screen 190 may receive the at least one touch from user's physical contact (e.g., with fingers including thumb) or via a touchable input device (e.g., a stylus pen). The touchscreen 190 may receive consecutive moves of one of the at least one touch. The touch screen 190 may send an analog signal corresponding to the consecutive moves of the input touch to the touchscreen controller 195.

The term 'touch' as used herein comprises contact touch and contactless touch (e.g., keeping a detectable distance less than 1 mm) between the touch screen 190 and the user's body or the touch input device. The detectable distance from the touch screen 190 may vary depending on the performance or structure of the apparatus 100. The touch screen 190 may be implemented in e.g., a resistive way, capacitive way, infrared way, or acoustic wave way.

In exemplary embodiments of the present invention, the touch screen 190 may display related objects or a list of the related objects upon occurrence of the selection gesture. In exemplary embodiments of the present invention, the touch screen 190 may display an additional objects list that includes at least one object to be additionally connected if at least one additional object exist after the link gesture is made between the first object and the second object.

The touch screen controller 195 converts the analog signal received from the touch screen 190 to a digital signal (e.g., XY coordinates) and transmits the digital signal to the controller 110. The controller 110 may control the touch screen 190 by using the digital signal received from the touch screen controller 195. For example, in response to the touch, the controller 110 may enable a shortcut icon (not shown) displayed on the touchscreen 190 to be selected or to be executed. The touch screen controller 195 may also be incorporated in the controller 110.

Figure 2:
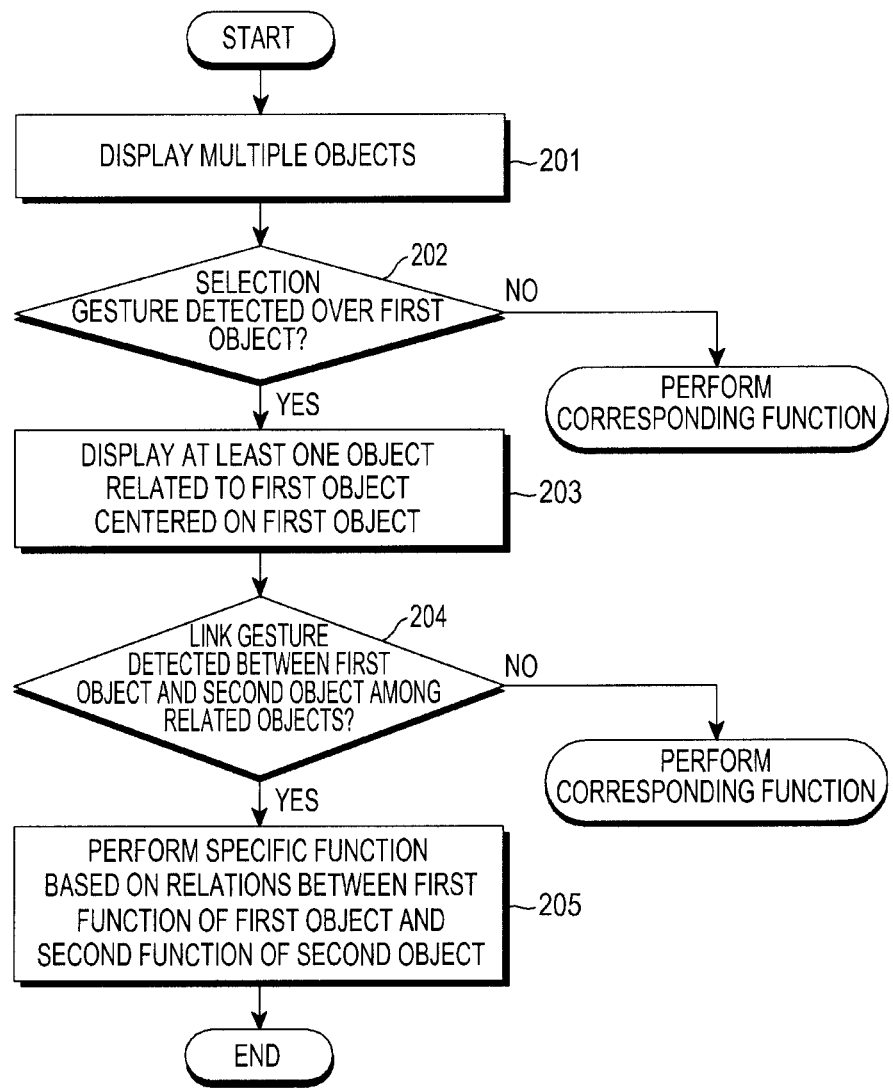
FIG. 2 is a flowchart of object executing operations of an electronic apparatus, according to an exemplary embodiment of the present invention.

FIG. 2 is a flowchart of object executing operations of an electronic apparatus, according to an exemplary embodiment of the present invention.

Referring to FIG. 2, a plurality of objects are displayed on the touch screen 190, in operation 201. In response to detection of a gesture to select a first object in operation 202, the controller 110 retrieves from storage 175 a related objects list of at least one related object capable of performing a function related to the first object and displays the related objects list on the touch screen 190 in operation 203. In response to detecting a link gesture made between the first object and a second object among the at least one related object in operation 204, the controller 110 performs a specific function based on relationships between a first function of the first object and a second function of the second object in operation 205.

Figure 3A:
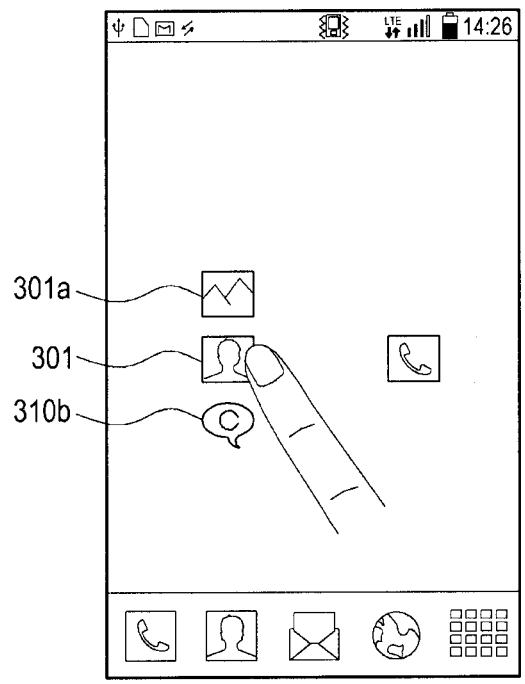
FIG. 3A, FIG. 3B, FIG. 3C, FIG. 4A, FIG. 4B, FIG. 5A, FIG. 5B, FIG. 6A, FIG. 6B, FIG. 7A, FIG. 7B, FIG. 8A, FIG. 8B, FIG. 9A, FIG. 9B, FIG. 9C, FIG. 10A, FIG. 10B, FIG. 11A, FIG. 11B, FIG. 12A, FIG. 12B, FIG. 12C and FIG. 12D are illustrative diagrams for explaining the exemplary embodiment of FIG. 2.
Figure 3B:
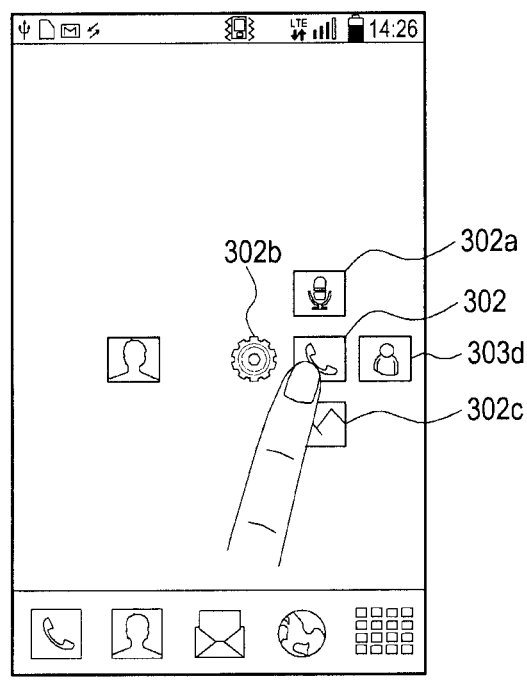

Operations of FIG. 2 will be further described with reference to FIGS. 3 through 12. Although in FIGS. 3 to 12 icons representing respective applications are represented as objects, objects may include any items, not only those icons but also widgets or pieces of data that may be connected together and relationships of which may be used to perform a specific function. FIGS. 3A and 3B illustrate a selection gesture to select an object arranging and displaying of related objects around the selected object. In FIG. 3A, when an icon 301 representing a particular person's contact is touched long in standby mode in which a plurality of icons are displayed on the screen, an icon 301a representing a gallery application and an icon 301b representing a messenger application, which may have functions related to the icon 301, are displayed in neighboring places centered on the icon 301.

Figure 3C:
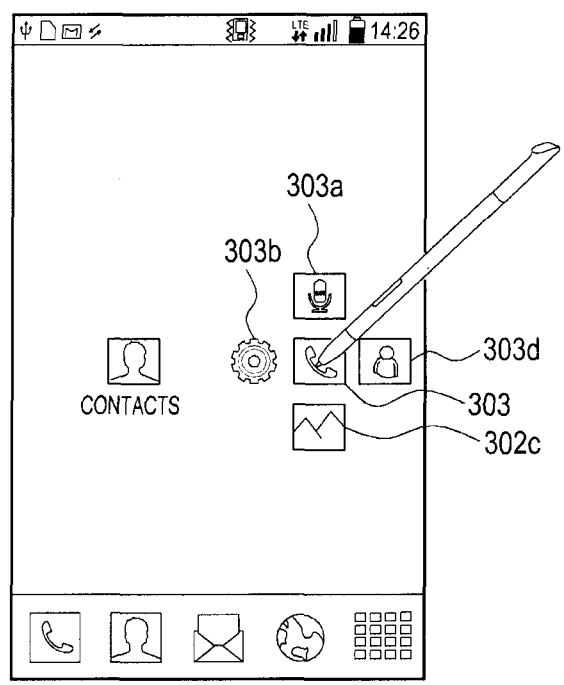
Figure 4A:
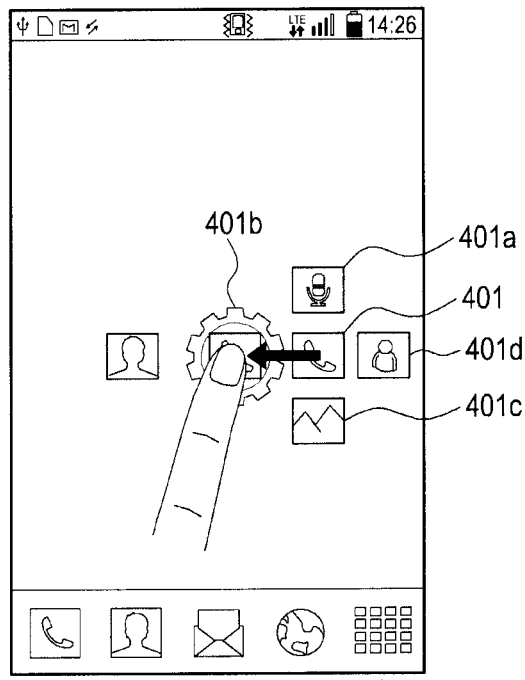
Figure 4B:
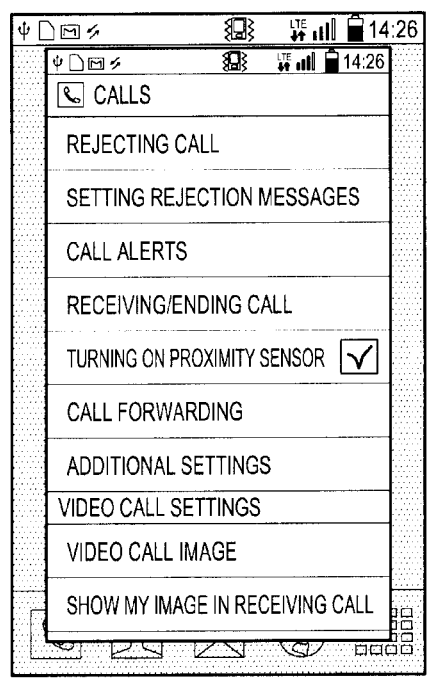

In FIG. 3B, when an icon 302 representing a call application is touched long in standby mode in which a plurality of icons are displayed on the screen, an icon 302a representing a voice recording application, an icon 302b representing an environment settings application, an icon 302c representing a gallery application, and an icon 302d representing a contacts application, which may have functions related to the icon 302, are displayed in neighboring places centered on the icon 302. In FIG. 3C, in response to a hovering event over an icon 303 representing a call application in standby mode in which a plurality of icons are displayed on the screen, an icon 303a representing a voice recording application, an icon 303b representing an environment settings application, an icon 302c representing a gallery application, and an icon 303d representing a contacts application, which may have functions related to the icon 303, are displayed in neighboring places centered on the icon 303.

Although FIGS. 3A to 3C illustrate that when a selection gesture is made for a particular icon, objects, which are icons in this embodiment, related to the particular icon are displayed near the particular icon, the position or shape of the related objects may vary in other embodiments. In exemplary embodiments of the present invention, the selection gesture is illustrated as a long touch or a hovering event, but the selection gesture is not limited to them but may include any other gestures. When a long touch is made as a selection gesture, an icon representing a recycle bin application may be added to the list of the related objects. Thus, if any one of the application (or object) for which the selection gesture is made and the at least one related application (or object) is selected and dragged to the recycle bin icon, the selected application may be deleted in the standby mode.

FIGS. 4 through 12 illustrate performing a specific function based on relationships between two objects. A link gesture illustrated in FIGS. 4 to 12 is a dragging gesture. However, the link gesture is not limited to the dragging gesture between two icons, but may include overlapping between two icons, selection on two icons in a certain time period, and other gestures. In FIG. 4A, while an icon 401 representing a call application (call icon 401) for which a selection gesture is made and related objects including an icon 401a representing a voice recording application (voice recording icon 401a), an icon 401b representing an environment settings application (environment settings icon 401*b*), an icon 401*c* representing a gallery application (gallery icon 401*c*), an icon 401*d* representing a contacts application (contacts icon 401*d*) are displayed in neighboring places centered on the icon 401, as described in connection with FIG. 3B or 3C, a dragging gesture is made from the call icon 401 to the environment settings icon 401*b*. Apparatus 100 changes the screen into call-related environment settings mode as shown in FIG. 4B, based on relationships between the call function of the icon 401 and the environment settings function of the icon 401*b*.

Figure 5A:
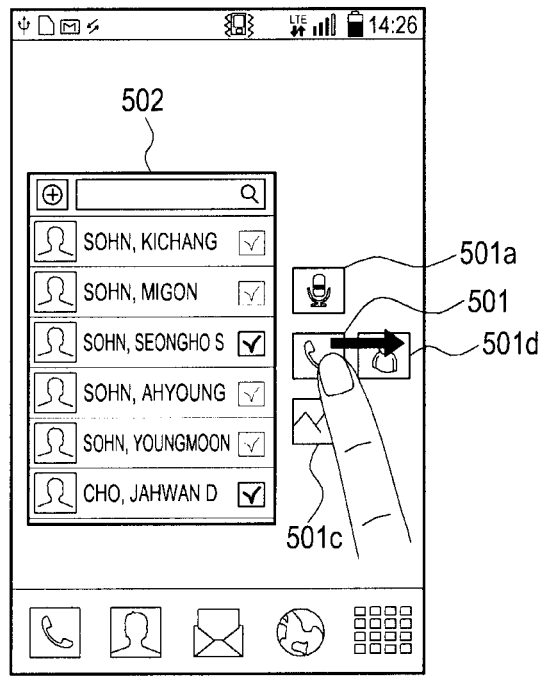
Figure 5B:
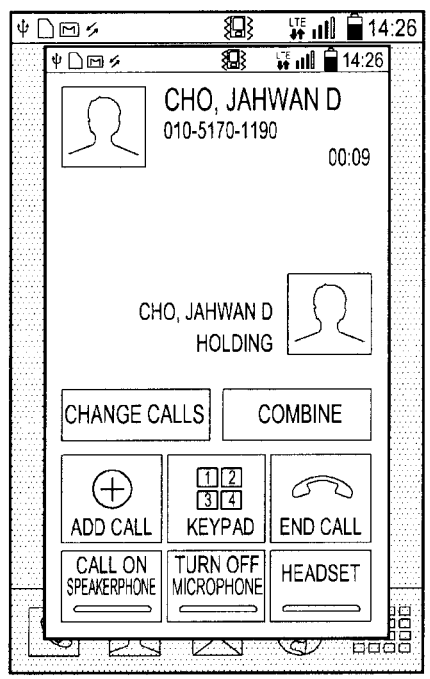

FIG. 5A shows a central icon 501 representing a call application for which a selection gesture is made and adjacent related objects including an icon 501*a* representing a voice recording application, an icon 501*b* (not shown) representing an environment settings application, an icon 501*c* representing a gallery application, an icon 501*d* representing a contacts application. If a dragging gesture is made from the call icon 501 to the contacts icon 501*d*, a contacts list 502 may be popped up on the screen. If multiple contacts are selected in the contacts list 502 and a 'done' or 'complete' button is pressed, a conference call (or multi-party call) to make calls with multiple parties simultaneously is initiated in response to relationships between the call function of the icon 501 and the contacts function of the icon 501*d*, as shown in FIG. 5B. Controller 110 supports at least one of, a particular function and a sequence of particular functions in response to a relationship and association between a first function of a first object and a second function of a second object and in response to a link gesture associating the first object and the second object. Storage 175 stores a map comprising a look-up table, associating particular executable objects and their respective functions, including associating the first and second objects, for example, with one or more additional functions of additional objects (and of the first and second objects). Controller 110 employs the map in identifying and automatically supporting at least one of, a particular function and a sequence of particular functions of multiple objects with linked first and second objects in response to a link gesture associating the first object and the second object.

Figure 6A:
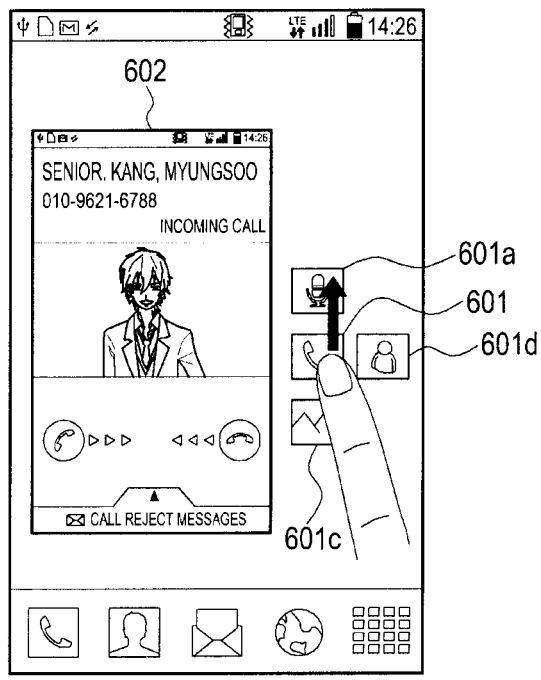
Figure 6B:

FIG. 6A, shows central icon 601 representing a call application for which a selection gesture is made and adjacent related objects including an icon 601*a* representing a voice recording application, an icon 601*b*(not shown) representing an environment settings application, an icon 601*c* representing a gallery application, an icon 601*d* representing a contacts application. In response to a dragging gesture made from the call icon 601 to the voice recording icon 601*a*, a contacts list 502 may be displayed on the screen, which is not shown in FIG. 6A. If a party is selected from the contacts list 502 and a 'done' button is pressed, a call to the party is tried and a calling screen 602 may be popped up on the screen. If the call is made with the party, voice recording of the call is automatically performed based on relationships between the call function of the icon 601 and the voice recording function of the icon 601*a*, as shown in FIG. 6B.

Figure 7A:
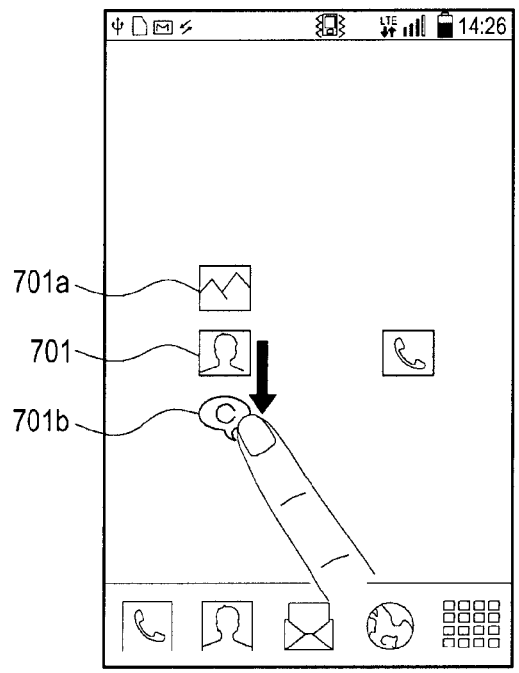
Figure 7B:
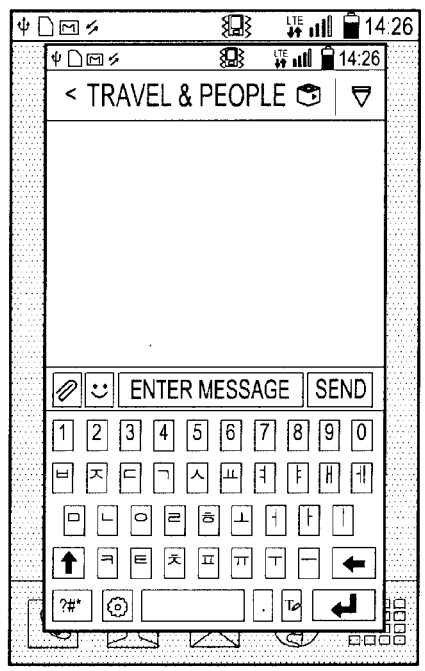

FIG. 7A, shows a centralized icon 701 representing a particular person's contact for which the selection gesture is made as shown in FIG. 3A, and adjacent related objects including an icon 701*a* representing a gallery application capable of a function related to the icon 701 and an icon 701*b* representing a messenger application. In response to a dragging gesture between the particular person's contact icon 701 and the messenger icon 701*b*, Accordingly, as shown in FIG. 7B, a chatting window may be opened for the user to exchange messages with the particular person, based on relationships between the particular person's contact of the icon 701 and the messenger function of the icon 701*b*.

Figure 8A:
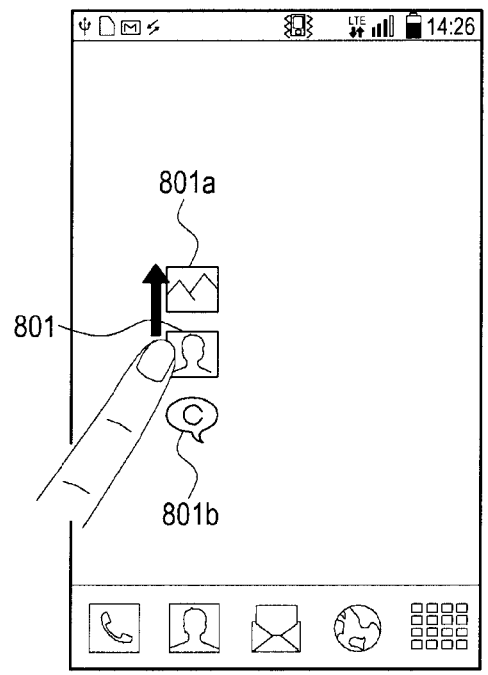
Figure 8B:
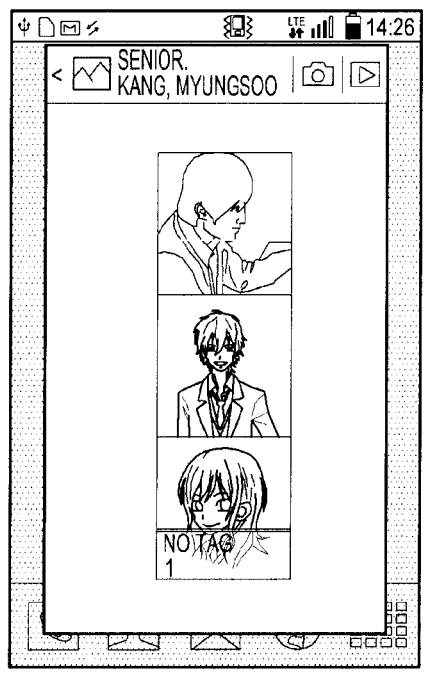

FIG. 8A, shows a central icon 801 representing a particular person's contact) for which the selection gesture is made, and adjacent related objects including an icon 801*a* representing a gallery application and an icon 801*b* representing a messenger application. In response to a dragging gesture between the particular person's contact icon 801 and the gallery icon 801*a*, a folder having tag information regarding the particular person is made in the gallery application and images included in the folder may be displayed as shown in FIG. 8B. Alternatively, instead of making such a folder, images having tag information regarding the particular person are searched for, selected from a plurality of images stored in the gallery application and displayed.

Figure 9A:
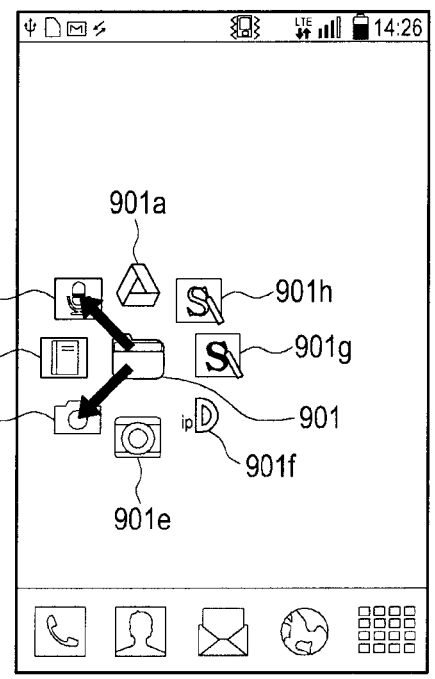
Figure 9B:
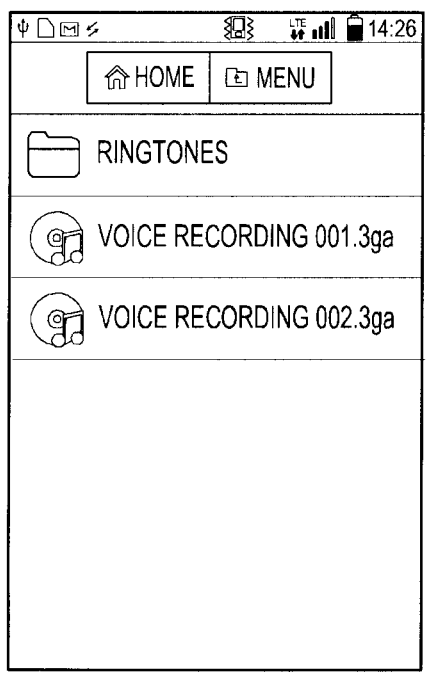

FIG. 9A, shows a central icon 901 representing a 'my files' application (or my file icon) for which the selection gesture is made, and adjacent related objects including icons 901*a* to 901*h* representing respective applications are displayed. In response to a dragging gesture between the my file icon 901 and an icon 901*b* representing a voice recording application, a folder including voice files recorded by running the voice recording application may be searched for in the folders of 'my file' and the voice files of the searched folder may be displayed, as shown in FIG. 9B, based on relationships between the file function of the icon 901 and the voice recording function of the icon 901*b*.

Figure 9C:
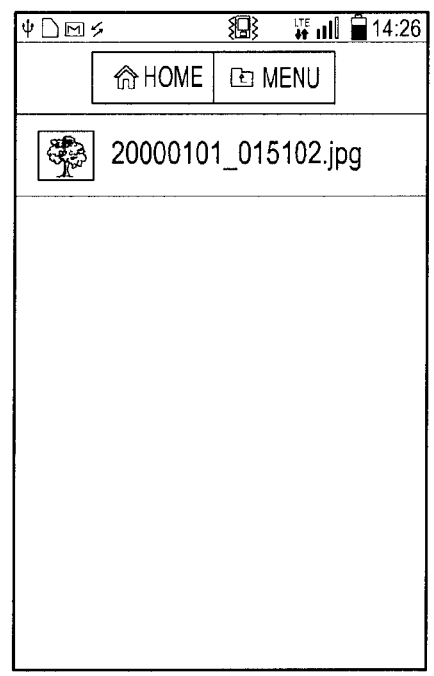

The my file icon and related objects including icons 901*a* to 901*g* are displayed as shown in FIG. 9A. In response to a dragging gesture between the my file icon 901 and an icon 901*d* representing a camera application, a folder including image files made by running the camera application may be searched for from between folders of 'my file' and the image files of the searched folder may be displayed as shown in FIG. 9C, based on relationships between the file function of the icon 901 and the camera function of the icon 901*d*.

Figure 10A:
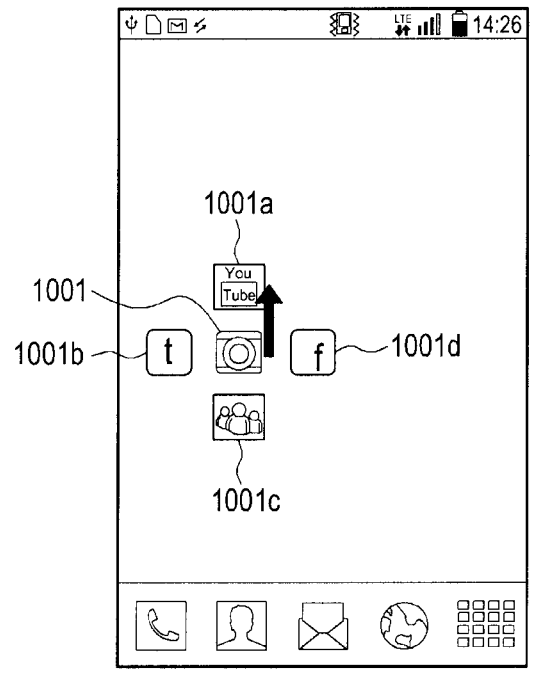
Figure 10B:
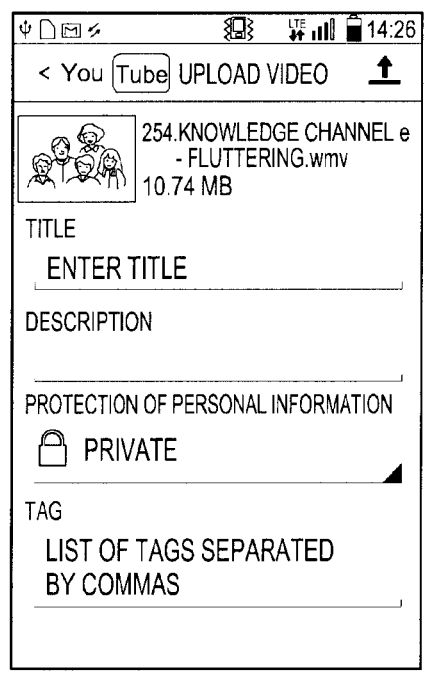

FIG. 10A shows a central icon 1001 representing a camera application (or camera icon) for which a selection gesture is made, and adjacent related objects including icons 1001*a* to 1001*h* representing respective applications. In response to a dragging gesture between the camera icon 1001 and an icon 1001*a* representing a YouTube application, an upload screen for uploading video or photos through the YouTube application may be displayed, as shown in FIG. 10B, based on relationships between the camera function of the icon 1001 and the YouTube function of the icon 1001*a*.

Figure 11A:
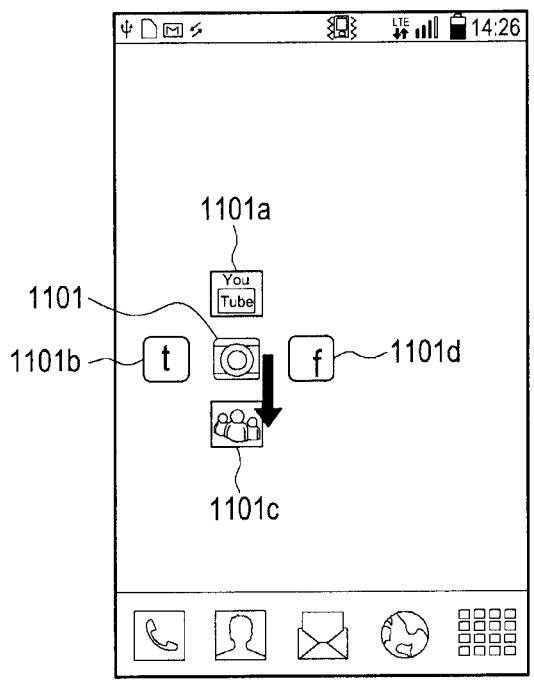
Figure 11B:
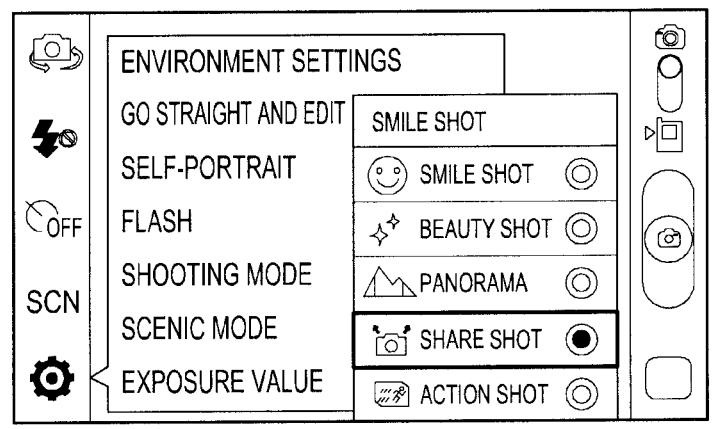

FIG. 11A, shows a central icon 1101 representing the camera application (or a camera icon 1101) for which a selection gesture was made and adjacent related objects including icons 1101*a* to 1101*d* representing related applications. In response to a dragging gesture between the camera icon 1101 to an icon 1101*c* representing a group caster application, share shot mode is automatically selected from between various camera shooting modes and the apparatus 100 may enter the share shot mode, as shown in FIG. 11B, based on relationships between the camera function of the icon 1101 and the group caster function of the icon 1101.

Figure 12A:
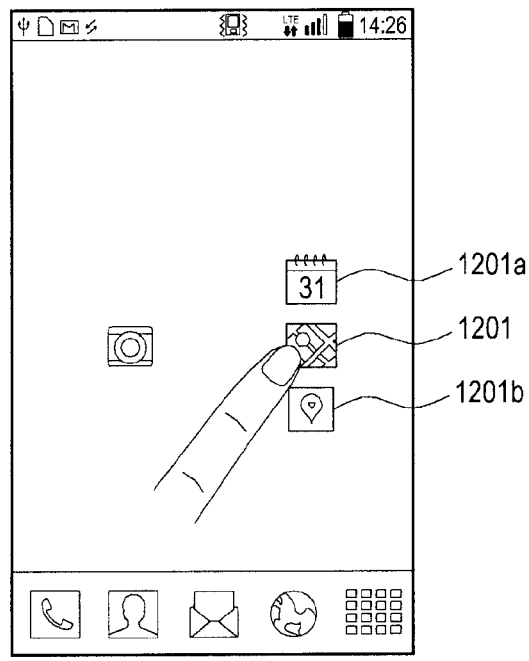
Figure 12B:
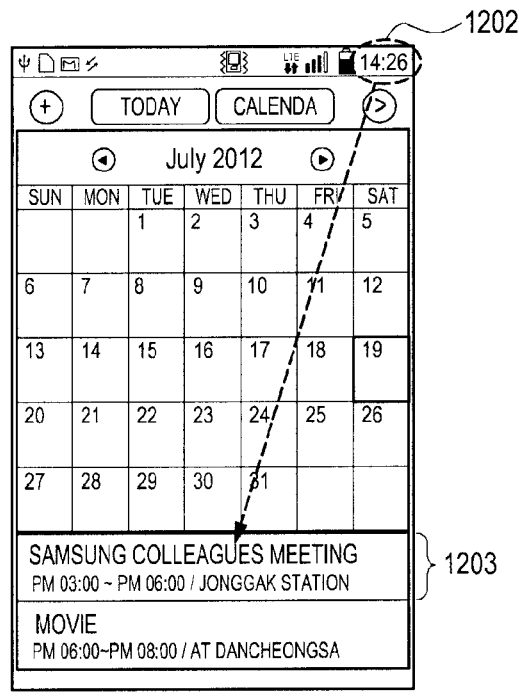
Figure 12C:
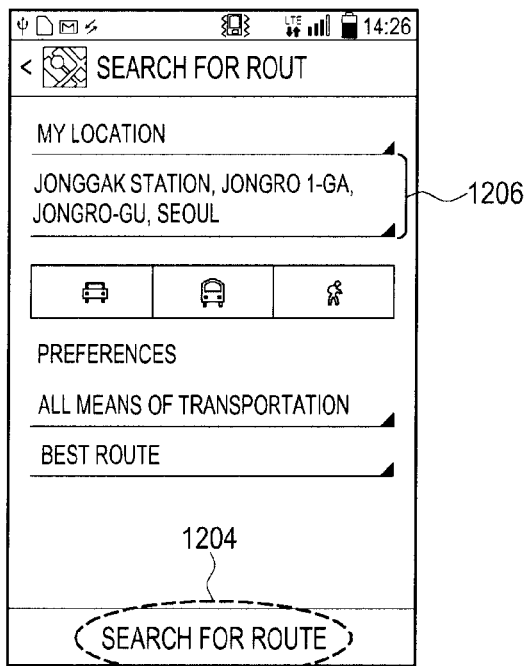
Figure 12D:
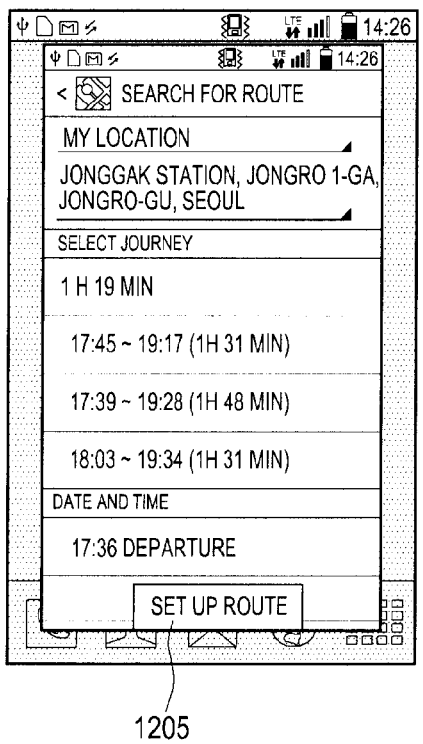

FIG. 12A shows a central icon 1201 representing a map application (or map icon 1201) for which the selection gesture was made and adjacent related objects including icons 1201*a* and 1201*b* representing respective applications. In response to a dragging gesture made between the map icon 1201 and an icon 1201*a* representing a calendar application, a nearest event or plan 1203 from the current time, which is e.g., 14:26 1202, is searched for from between events or plans registered in the calendar application, but the screen of FIG. 12B is not presented to the user. The searched event or plan 1203 is sent to the map application and taken into account in determining a destination 1206 in the map application, as shown in FIG. 12C. In response to the event being sent to the map application to determine the destination, the user may press "search for route" button 1204. As shown in FIG. 12D, route information to get to the destination based on the event 1203 is displayed. The screen of FIG. 12D may be changed to navigation mode to inform the user of real-time routes to the destination and include route set up button 1205.

Figure 13:
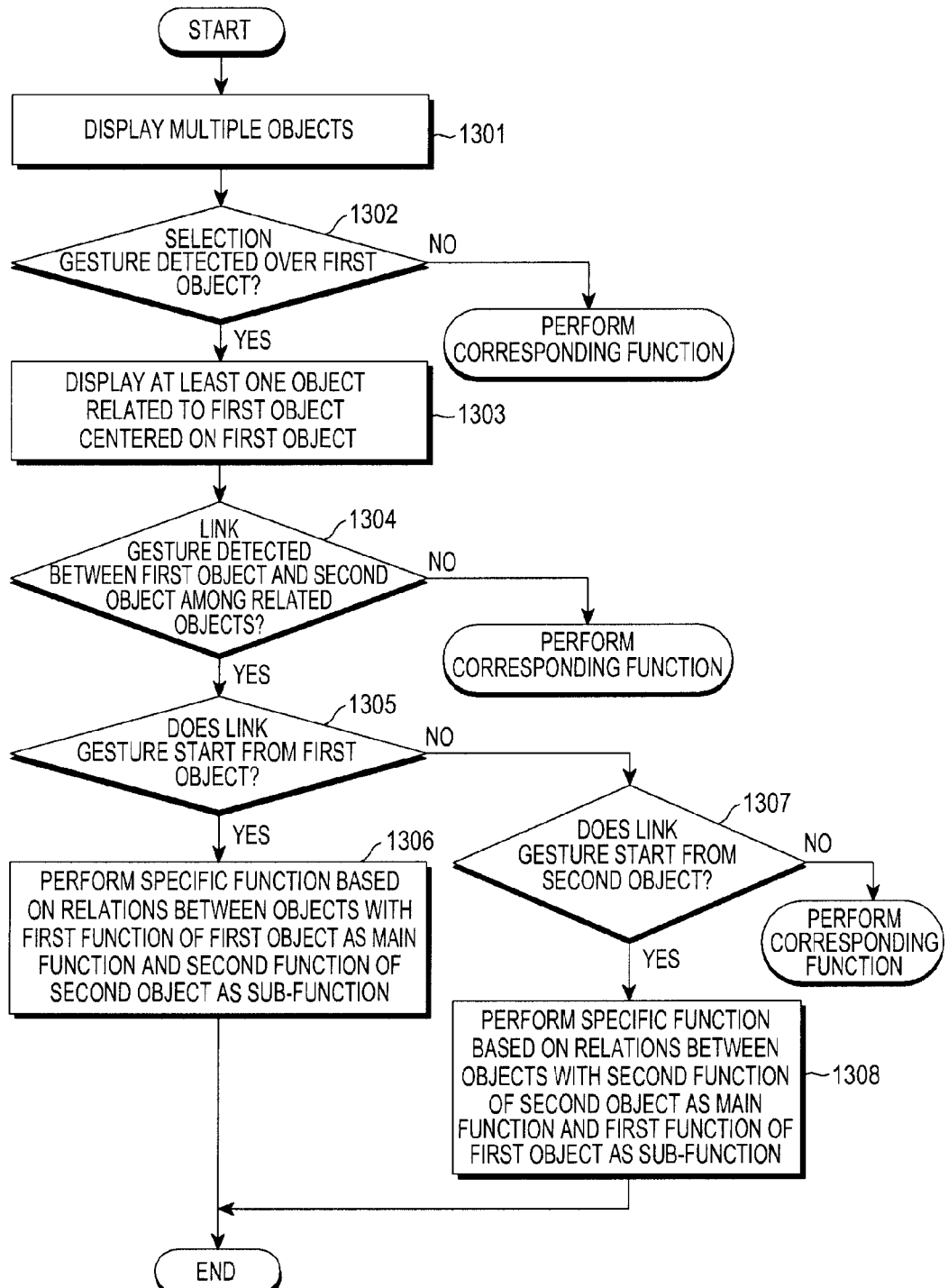
FIG. 13 is a flowchart of object executing operations of an electronic apparatus, according to another exemplary embodiment of the present invention.

FIG. 13 is a flowchart of object executing operations of an electronic apparatus, according to another exemplary embodiment of the present invention.

Referring to FIG. 13, a plurality of objects are displayed on the touch screen 190, in operation 1301. In response to a detected gesture to select a first object from the plurality of objects in operation 1302, the controller 110 finds from a list in storage 175 related objects capable of performing functions related to the first object and displays the related objects or the list of the related objects on the touch screen 190 in operation 1303. In response to a detected link gesture made between the first object and a second object in operation 1304, the controller 110 determines start object from which the link gesture began in operations 1305 and 1307.

If the link gesture starts from the first object in operation 1305, the controller 110 sets up a first function of the first object as a main function and a second function of the second object as a sub-function and performs a specific function with the main and sub functions based on relationships between the first object and the second object in operation 1306. If the link gesture starts from the second object in operation 1307, the controller 110 sets up the second function of the second object as a main function and the first function of the first object as a sub-function and performs a specific function with the main and sub functions based on relationships between the first object and the second object in operation 1308.

Although in the following examples, icons of applications are represented as objects, objects may include any items, not only those icons but also widgets or pieces of data that may be connected together and relationships which may be used to perform a specific function. For example, when a link gesture between an icon representing a help application (or help icon) and an icon representing an alarm application (or alarm icon) is made starting from the help icon, help items regarding alarm settings may be searched for in available help items and displayed. Otherwise, if the link gesture starts from the alarm icon, the apparatus 100 runs the alarm application to allow the user to set alarms with a help guide to help the user set alarms.

In another example, if a link gesture between an icon representing a message application (a message icon) and an icon representing an alarm application (an alarm icon) is made starting from the message icon, the apparatus 100 enters reserved sending mode in the message application. Otherwise, if the link gesture starts from the alarm icon, the apparatus 100 outputs an alarm sound for message reception instead of a predetermined message reception sound to ensure the user to be informed of the message reception. In another example, if a link gesture between an icon representing an application to command the apparatus by voice, such as S-Voice® application (an S-Voice® icon) and an icon representing an email application (an email icon) is made starting from the 5-Voice® icon, the apparatus 100 may provide a Speech to Text (STT) function by immediately perform an 'email sending' function by voice in the S-Voice® application. Otherwise, if the link gesture starts from the email icon, the apparatus 100 performs a function to read out the content of a received email by voice. In another example, if a link gesture between an icon representing a DMB application (or a DMB icon) and an icon representing a navigation application (or a navigation icon) is made starting from the DMB icon, the apparatus 100 may move to a traffic information provider channel between a number of channels provided by the DMB application. Otherwise, if the link gesture starts from the navigation application, the apparatus 100 may enable a Closed Circuit Television (CCTV) function between route guide-related functions provided by the navigation application.

In another example, if a link gesture between an icon representing an AllShare Play application (or an AllShare Play icon) and an icon representing a gallery application (or a gallery icon) is made starting from the AllShare Play icon, the apparatus 100 may directly move to a picture (or photo) classification folder in a list provided by the AllShare Play application. Otherwise, if the link gesture starts from the gallery icon, the apparatus 100 provides a function capable of directly sending a selected photo to a shared device. In another example, if a link gesture between an icon representing a camera application (or a camera icon) and an icon representing a video player application (or a video player icon) is made starting from the camera icon, the apparatus 100 immediately enters recording mode of the camera application. Otherwise, if the link gesture starts from the video player icon, the apparatus 100 may provide a function to list and selectively show only user-made images except for images like films, dramas and documentaries stored in storage 175. In another example, if a link gesture between an icon representing a wallet application (or a wallet icon) and an icon representing regional information or a map application (or a map icon) is made starting from the wallet icon, the apparatus 100 may provide a function to list available cards or coupons in the current location between cards or coupons registered in the wallet application. Otherwise, if the link gesture starts from the map icon, the apparatus 100 may provide a function to show information regarding locations where any card(s) registered in the wallet application was used in the form of a map (e.g., a private map provided by the Google Map®) using the regional information or the map application.

In another example, if a link gesture between an icon representing a music application (e.g., Melon®) (or a music icon) and an icon representing a regional information application is made starting from the music icon, the apparatus 100 may provide a function of playing music related to a current location (e.g. Korean pops in Korea, American pops in the U.S., samba in Brazil, etc.). Otherwise, if the link gesture starts from the regional information application, the apparatus 100 may provide music-related information, such as concerts, karaokes, for example, provided by the regional information application. In another example, if a link gesture between an icon representing a health-related application (e.g., S Health® application) (or a health-related icon) and an icon representing a map application (or a map icon) is made starting from the health-related application, the apparatus 100 may display a screen to provide moving track information for the health-related application. Otherwise, if the link gesture starts from the map icon, the apparatus 100 may provide a best jogging course around the current location.

In another example, if a link gesture between an icon representing a Dropbox® application (or a Dropbox® icon)

or an icon representing a gallery application is made starting from the Dropbox® icon, the apparatus 100 may provide a function to upload some photos through the Dropbox® application. Otherwise, if the link gesture starts from the gallery icon, the apparatus 100 may mark photo files uploaded through the Dropbox® application with e.g., checkbox or light shade of gray, thereby providing convenience for the user in determining which one of the files stored in the gallery application has not yet been backed up in the Dropbox® application. In another example, if a link gesture between camera applications is made, e.g., if a camera application is selected within a certain period of time, the apparatus 100 may enter dual camera mode (in which both front and rear cameras are activated to take a photo) in a selection between different modes provided in the camera application.

Figure 14:
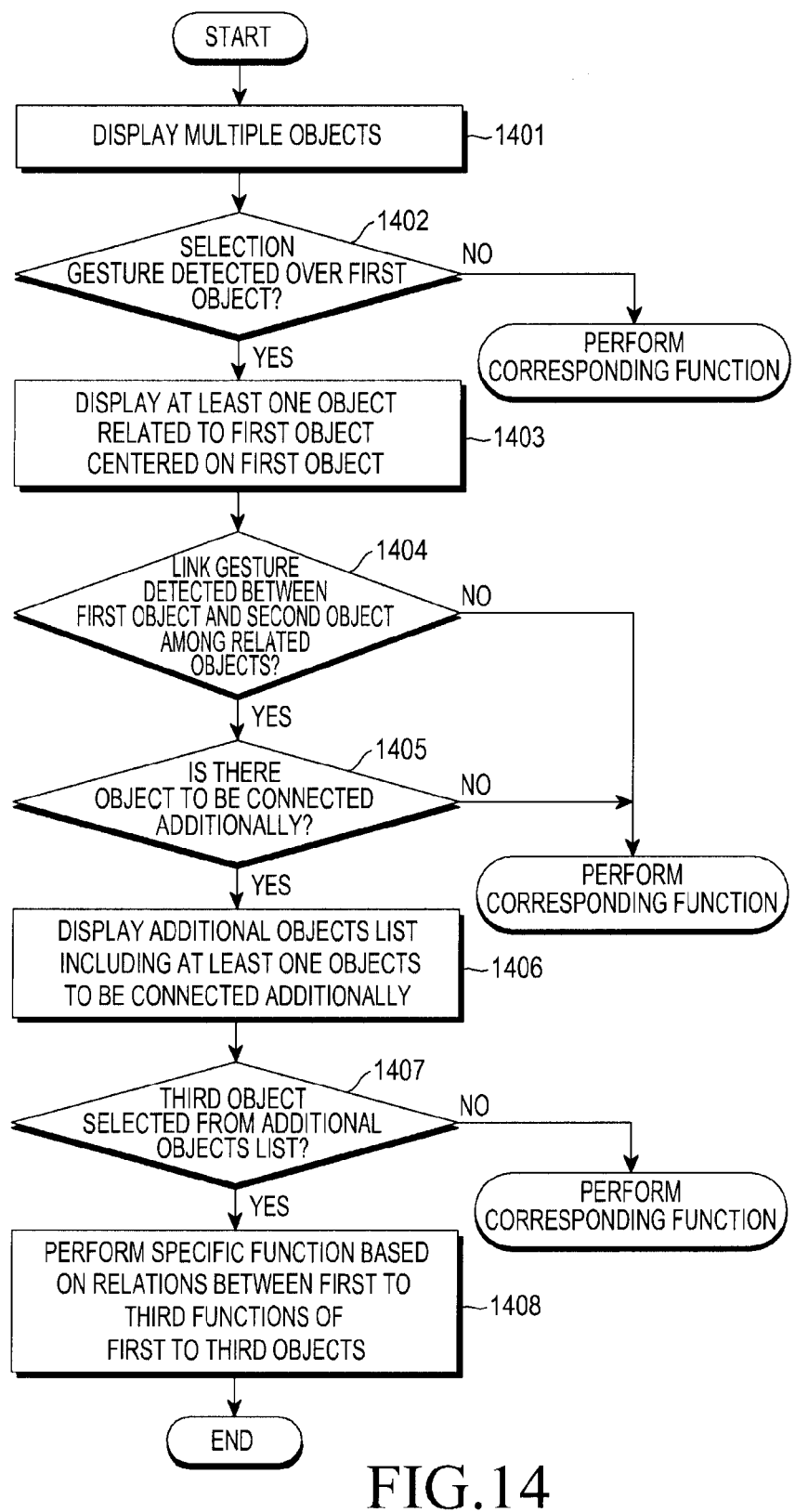
FIG. 14 is a flowchart of object executing operations of an electronic apparatus, according to another exemplary embodiment of the present invention.

FIG. 14 is a flowchart of object executing operations of an electronic apparatus, according to another exemplary embodiment of the present invention.

Referring to FIG. 14, a plurality of objects are displayed on the touch screen 190, in operation 1401. In response to detecting a gesture to select a first object from a plurality of objects in operation 1402, the controller 110 finds a list of related objects capable of performing functions related to the first object in unit 175 and displays the related objects or the list of the related objects on the touch screen 190 in operation 1403. In response to detecting a link gesture made between the first object and a second object in operation 1404, the controller 110 determines if at least one additional object exists to be further connected to the first and second objects, in operation 1405. If the at least one additional object exists, the controller 110 displays an additional objects list of at least one additional object that may be connected additionally through a user interface in operation 1406.

If a third object is selected from additional objects list in operation 1407, the controller 110 performs a specific function based on relationships between a first function of the first object, a second function of the second object, and a third function of the third object in operation 1408. In the flowcharts herein, a "perform corresponding function" operation comprises performing a function associated with a gesture and object of the operation concerned (e.g., from operations 1402, 1404, 1405 and 1407 of FIG. 14). Operations of FIG. 14 will be further described with reference to FIGS. 15A to 15D. Although in FIGS. 15A to 15D icons representing respective applications are represented as objects, objects may include any items, not only those icons but also widgets or pieces of data that may be connected together and relations of which may be used to perform a specific function.

Figure 15A:
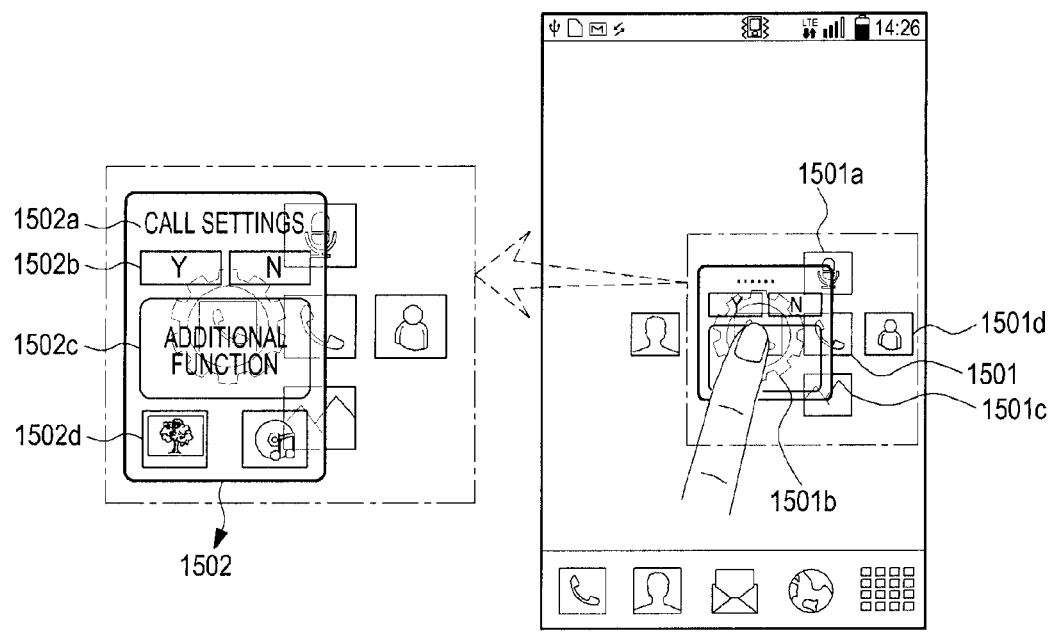
FIG. 15A, FIG. 15B, FIG. 15C and FIG. 15D are illustrative diagrams for explaining the exemplary embodiment of FIG. 14.

FIG. 15A shows a central icon 1501 representing a call application (or a call icon) for which a selection gesture is made and adjacent related objects including an icon 1501a representing a voice recording application, an icon 1501b representing an environment settings application, an icon 1501c representing a gallery application, and an icon 1501d representing a contacts application. In response to a link gesture between the call icon 1501 and the environment settings icon 1501b, a user interface 1502 is displayed to connect the at least one additional application upon determination of an additional application that may be connected to the call icon 1501 and the environment settings icon 1501b. The user interface 1502 includes a description area 1502a, a selection area 1502b, an input area 1502c and a list area 1502d. The description area 1502a indicates an application to be linked; the selection area 1502b allows the user to select whether to perform a specific function by linking functions of the applications indicated in the description area 1502; the input area 1502c indicates an additional application selected by the user from the additional object list displayed in the list area 1502d; and the list area 1502d includes the additional object list of at least one additional application.

Figure 15B:
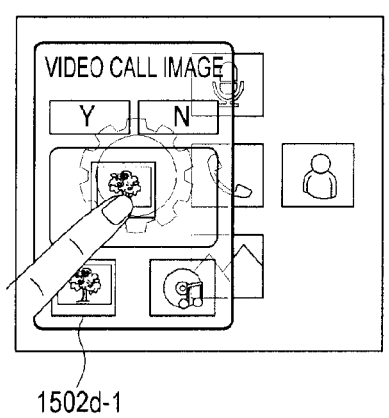
Figure 15C:
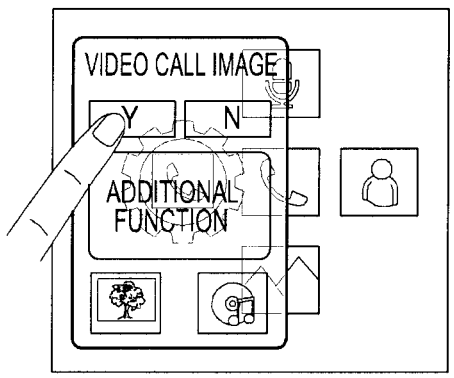
Figure 15D:
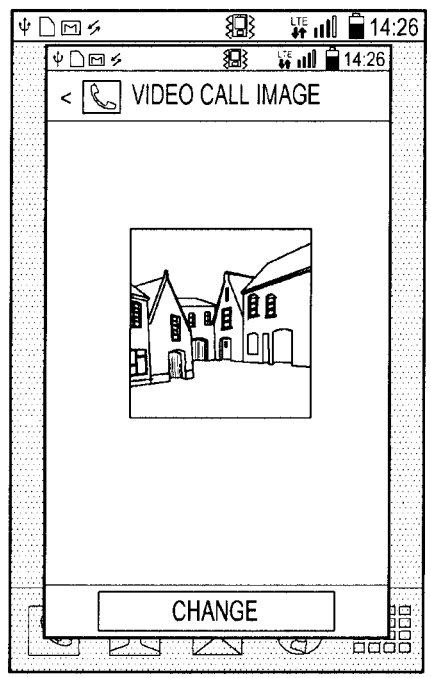

If the user selects "Yes (Y)" in the selection area 1502b of the user interface 1502, the apparatus 100 performs a specific function based on relationships between the call function of the call application and the environment settings function of the environment settings application, i.e., the apparatus 100 may enter call setting mode between different environment settings modes. If the user selects "No (N)" in the selection area 1502b, the link gesture between the call icon and the environment settings icon may be ignored. If the user selects an icon 1502d-1 representing a gallery application from applications indicated in the list area 1502d and moves the gallery icon 1502d-1 as shown in FIG. 15B, into the input area 1502c, a description of a function to be performed based on relationships between the three applications, call, environment settings, and gallery applications is displayed in the description area 1502a, i.e. "video call image". Subsequently, if the user selects "Y" in the selection area 1502b as shown in FIG. 15C, the apparatus 100 may automatically enter the video call image mode in which to set up a default image to be displayed while in video calling, in the video call settings among environment settings items provided by the environment settings application, and then a video call is made with the default image displayed, as shown in FIG. 15D.

Figure 16:
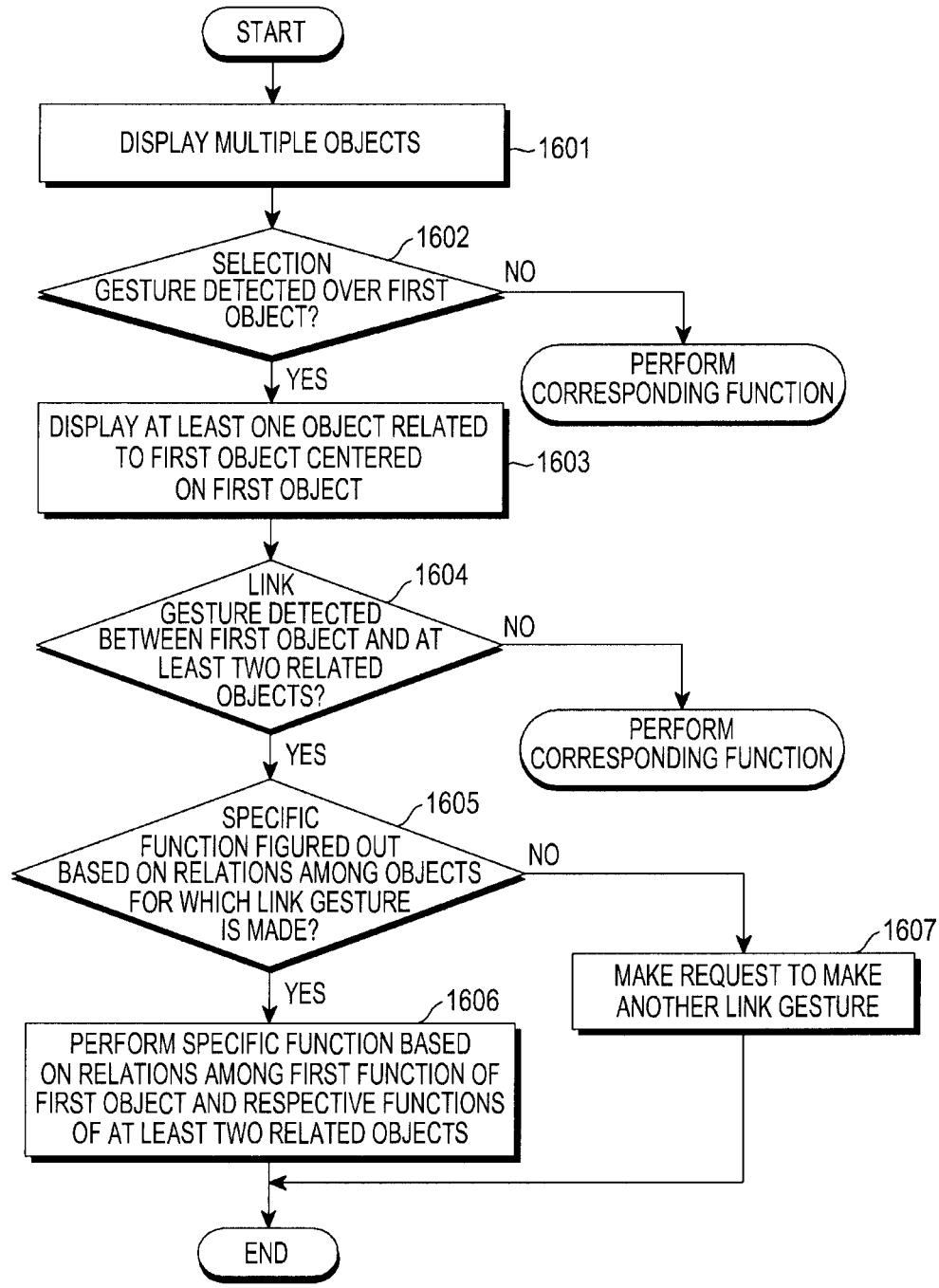
FIG. 16 is a flowchart of object executing operations of an electronic apparatus, according to another exemplary embodiment of the present invention.

FIG. 16 is a flowchart of object executing operations of an electronic apparatus, according to another exemplary embodiment of the present invention.

Referring to FIG. 16, a plurality of objects on the touch screen 190, in operation 1601. In response to detecting a gesture to select a first object from the plurality of objects in operation 1602, the controller 110 finds in storage 175 a list of related objects capable of performing functions related to the first object and displays the related objects or the list of the related objects on the touch screen 190 in operation 1603. In response to detecting a link gesture made between the first object and at least two of the related objects in operation 1604, the controller 110 figures out a specific function based on relationships between a first function of the first object and respective functions of the at least two related objects in operation 1605. If the specific function based on relationships between the first function of the first object and the functions of the at least two related objects is identified, the specific function is performed in operation 1606. Relationships between the first object and the at least two related objects and thus the specific function may vary depending on the selected sequence of the first object and the at least two related objects by the link gesture. However, if the controller 110 fails to figure out any specific function based on relationships between the first object and the at least two related objects in operation 1605, the controller 110 may perform an operation of requesting the user to make another link gesture in operation 1607.

If the controller 110 succeeds in figuring out a specific function based on relationships between the first object and the at least two related objects for which the link gesture is made in operation 1607, the controller 110 may perform the specific function and let the user know of this.

Figure 17:
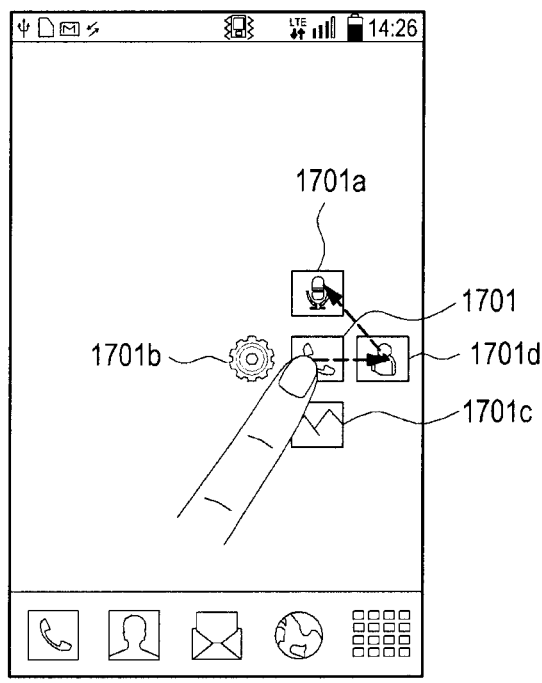
FIG. 17 and FIG. 18 are illustrative diagrams for explaining the exemplary embodiment of FIG. 16.

Operations of FIG. 16 will be further described with reference to FIGS. 17 and 18. Although in FIGS. 17 and 18 icons representing respective applications are represented as objects, objects may include any items, not only those icons but also widgets or pieces of data that may be connected together and relations of which may be used to perform a specific function. FIG. 17 shows a central icon 1701 representing a call application (or a call icon) for which a selection gesture is made and adjacent related objects including an icon 1701a representing a voice recording application, an icon 1701b representing an environment settings application, an icon 1701c representing a gallery application, and an icon 1701d representing a contacts application. Controller 110 detects a link gesture selecting, in sequence, the call icon 1701, the contacts icon 1701d, and the voice recording icon 1701a. In response to the detected sequence, apparatus 100 executes the contacts application and displays phone contacts stored in the phone book. If the user selects a party's phone number and presses the 'done' (or call) button, a function is performed where a call to the party is tried and, if the call is made, the content of the call is automatically recorded.

Figure 18:
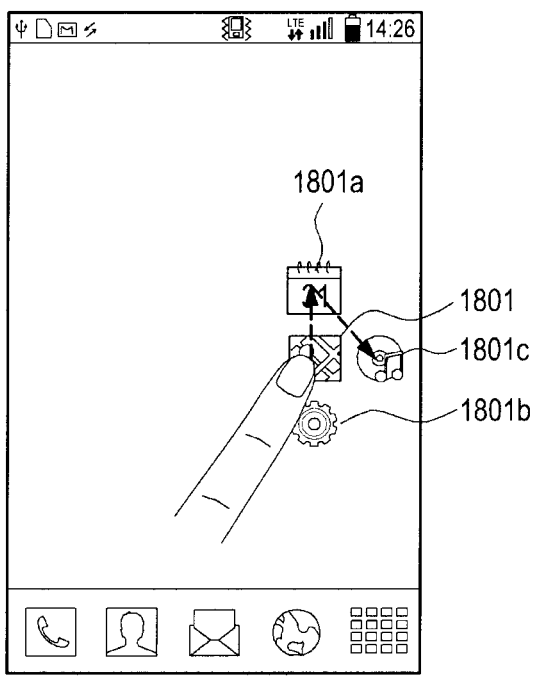

FIG. 18 shows a central icon 1801 representing a map application 1801 (or a map icon 1801) for which a selection gesture is made and adjacent related objects including an icon 1801a representing a calendar application, an icon 1801b representing an environment settings application, and an icon 1801c representing a music application. Controller 110 detects a sequence of selection of the map icon 1801, the calendar icon 1801a, and the music icon 1801c. In response to the detected sequence, apparatus 100 finds a nearest event or plan from the current times of events or plans registered in the calendar application, sends the event or plan to the map application, and executes the map application with a destination determined by taking into account the event or plan. If a user presses the "search for route" button in the map application, information about the route to the destination based on the event or plan is presented to the user, and the apparatus 100 enters navigation mode, informing the user of real time routes to the destination. When the destination is determined in the map application by taking into account the event or plan, the apparatus 100 also executes the music application and plays music.

The system advantageously enables a specific desired function to be located and performed quickly, via a user friendly interface. A user is able to acquire information with a particular gesture without need to memorize or reconfirm data and may intuitively set up or trigger a specific function without need to determine how to get the specific function. This reduces cumbersome interaction with an intuitive user interface and navigation system.

The object executing apparatus and method may be embodied as computer-readable codes on a computer-readable recording medium. The computer-readable recording medium is any data storage device that can store data which can be thereafter read by a computer system. Examples of the computer readable recording medium include ROM, RAM, Compact Disc (CD)-ROMs, magnetic tapes, floppy disks, optical data storage devices, for example. The computer readable recording medium can also be distributed over network coupled computer systems so that the computer readable code is stored and executed in a distributed fashion.

Different embodiments have been described in connection with e.g., mobile communication terminals, but a person of ordinary skill in the art will understand and appreciate that different modifications can be made. Thus, it will be apparent to those ordinary skilled in the art that the invention is not limited to the embodiments described.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An electronic apparatus comprising:
   a touch screen; and
   a controller configured to:
   detect a touch of a first icon exceeding a predetermined time period, wherein the first icon is configured to execute a phone function;
   control the touch screen to display a plurality of related icons around the first icon, in response to detection of the touch of the first icon, the plurality related icons capable of performing respective functions related to the first icon;
   perform a specific function based on a relationship between at least one function of the first icon and at least one function of a second icon, wherein the second icon is configured to cause the electronic apparatus to record sound, among the plurality of related icons responsive to receiving a dragged touch from the first icon to the second icon;
   wherein when performing the specific function, the controller is configured to:
   responsive to the dragged touch from the first icon to the second icon:
   display a contacts list; and
   responsive to a selection of a contact in the contacts list, automatically perform a call to the selected contact, record voice data associated with the call, and display an interface with a visual indicator to indicate that the call is being recorded.

2. The electronic apparatus of claim 1, wherein the controller is configured to:
   control the touch screen to display a list of additional icons including at least one icon associated with the first and second icons in response to detection of the dragged touch; and perform a specific function based on a relationship between functions of the first, second, and an additional icon.

3. The electronic apparatus of claim 2, wherein the controller is configured to control to the touch screen to display a user interface enabling a user to select the additional icon from a list of additional icons.

4. The electronic apparatus of claim 1, wherein the controller is further configured to perform a specific function based on a relationship between respective functions of the first icon and at least two icons of the plurality of related icons in response to a dragged touch from the first icon to the at least two related icons.

5. The electronic apparatus of claim 4, wherein the controller is configured to:
  determine a sequence of selection of the first icons and the at least two related icons, in response to the dragged touch from the first icon to the at least two related icons; and
  perform the specific function selected based on a different relationship between the first icon and at least two related icons depending on the sequence of selection of the first icon and the at least two related icons determined by the dragged touch.

6. The electronic apparatus of claim 4, wherein the controller is configured to prompt making of another dragged touch, in response to a failure to identify the specific function.

7. An object executing method comprising:
  detecting a touch of a first icon exceeding a predetermined time period, on a screen of an electronic device, for which a touch is made, wherein the first icon is configured to execute a phone function;
  displaying a plurality of related icons around the first icon, in response to detection of the touch of the first icon, the plurality related icons capable of performing respective functions related to the first icon; and
  performing a specific function based on a relationship between at least one function of the first icon and at least one function of a second icon among the plurality of related icons, wherein the second icon is configured to cause the electronic device to record sound, responsive to receiving a dragged touch from the first icon to the second icon,
  wherein the performing of the specific function comprises:
  responsive to the touch dragged from the first icon to the second icon:
    displaying a contacts list; and
    responsive to a selection of a contact in the contacts list, automatically performing a call to the selected contact, recording voice data associated with the call, and displaying an interface with a visual indicator to indicate that the voice data associated with the call is being recorded.

8. The object executing method of claim 7, further comprising:
  displaying additional icons, including at least one icon associated with the first and second icons in response to detection of the dragged touch; and
  performing a specific function based on a relationship between functions of the first, second, and an additional icon if the additional icon is selected from a list of additional icons.

9. The object executing method of claim 8, wherein the list of additional icons are displayed via a user interface enabling a user to select the additional icon from the list of additional icons.

10. The object executing method of claim 7, further comprising:
  performing a specific function based on a relationship between respective functions of the first icon and at least two of the plurality of related icons in response to detection of a dragged touch between the first icon and the at least two related icons.

11. The object executing method of claim 10, the performing the specific function comprises:
  determining a sequence of selection of the first icon and the at least two related icons, in response to the dragged touch from the first icon to the at least two related icons; and
  performing the specific function selected based on a different relationship between the first icon and the at least two related icons depending on the sequence of selection of the first icon and the at least two related icons determined by the dragged touch.

12. The object executing method of claim 10, further comprising:
  prompting making another dragged touch in response to a failure to identify the specific function.

* * * * *